(12) United States Patent
Fukuda et al.

(10) Patent No.: US 8,380,431 B2
(45) Date of Patent: Feb. 19, 2013

(54) VEHICLE-MOUNTED DEVICE, NAVIGATION SYSTEM, AND CONTROL METHOD FOR NAVIGATION SYSTEM

(75) Inventors: Takako Fukuda, Kobe (JP); Keisuke Okamoto, Tokyo-to (JP); Hiroaki Sekiyama, Tokyo (JP); Yoshihiro Oe, Kawasaki (JP); Tokuhiko Nishiba, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 150 days.

(21) Appl. No.: 13/056,768

(22) PCT Filed: Jul. 28, 2009

(86) PCT No.: PCT/JP2009/063406
§ 371 (c)(1),
(2), (4) Date: Mar. 21, 2011

(87) PCT Pub. No.: WO2010/013703
PCT Pub. Date: Apr. 2, 2010

(65) Prior Publication Data
US 2011/0161003 A1    Jun. 30, 2011

(30) Foreign Application Priority Data
Jul. 31, 2008 (JP) .................. 2008-198994

(51) Int. Cl.
*G01C 21/20* (2006.01)
*G01C 21/26* (2006.01)
*G01C 21/30* (2006.01)
(52) U.S. Cl. ............ 701/447; 701/446; 340/995.24
(58) Field of Classification Search ............ 701/201
See application file for complete search history.

(56) References Cited

U.S. PATENT DOCUMENTS
(Continued)

FOREIGN PATENT DOCUMENTS
DE  19927647 A1  12/2000
JP  2000337913 A  12/2000
(Continued)

OTHER PUBLICATIONS

Office action issued Jun. 1, 2012 for German Patent Application No. 112009001840.8 and English language translation thereof.
(Continued)

*Primary Examiner* — Shelley Chen
(74) *Attorney, Agent, or Firm* — Gifford, Krass, Sprinkle, Anderson & Citkowski, P.C.

(57) ABSTRACT

A vehicle-mounted device 10 includes reception means 60 for receiving a telephone number and positional information about a first point location from a portable device 30, storage means 70 for storing telephone numbers and positional information about multiple second point locations, first comparison means 62a for comparing the telephone number of the first point location with the telephone numbers of the multiple second point locations, second comparison means 62b for comparing the positional information about the first point location with the positional information about the multiple second point locations, display means 63 for displaying a point of interest on a map on the basis of comparison results of the first and second comparison means by using either the positional information about the first point location or the positional information about one of the multiple second point locations corresponding to the first point location. A navigation system 100 includes the above vehicle-mounted device 10 and the portable device 30.

6 Claims, 10 Drawing Sheets

U.S. PATENT DOCUMENTS

| | | | |
|---|---|---|---|
| 5,884,193 A * | 3/1999 | Kaplan | 455/565 |
| 5,950,138 A * | 9/1999 | Norimatsu | 455/551 |
| 6,041,281 A * | 3/2000 | Nimura et al. | 701/533 |
| 6,091,810 A * | 7/2000 | Shaffer et al. | 379/221.02 |
| 7,941,557 B2 * | 5/2011 | Zhu et al. | 709/238 |
| 2006/0259235 A1 * | 11/2006 | Yamakage | 701/208 |
| 2007/0185650 A1 * | 8/2007 | Yokota et al. | 701/211 |
| 2009/0109978 A1 * | 4/2009 | Zhu et al. | 370/395.52 |

FOREIGN PATENT DOCUMENTS

| | | |
|---|---|---|
| JP | 2003177027 A | 6/2003 |
| JP | 2005030895 A | 2/2005 |
| JP | 2005100277 A | 4/2005 |
| JP | 2005227117 A | 8/2005 |
| JP | 2005249466 A | 9/2005 |
| JP | 2007263802 A | 10/2007 |
| JP | 2008122227 | 5/2008 |

OTHER PUBLICATIONS

Notification of Reason(s) for Refusal of JP2008-198994, Dispatch Date: Nov. 16, 2010.

Notification of Reason(s) for Refusal of JP2008-198994, Dispatch Date: Feb. 22, 2011.

* cited by examiner

12: CONTROL PART  32: CONTROL PART
14: STORAGE PART  34: STORAGE PART
20: DISPLAY PART  40: DISPLAY PART
22: OPERATION PART  42: OPERATION PART
46: TELEPHONE IF

90a: STORAGE AREA FOR
     VEHICLE-MOUNTED DEVICE

FIG. 8

| Name | Address | Telephone number | Distance difference | Positional information | |
|---|---|---|---|---|---|
| ○ | ○ | ○ | ○ | VEHICLE-MOUNTED DEVICE | A |
| ○ | ○ | ○ | × | PORTABLE DEVICE | B |
| ○ | ○ | × | ○ | PORTABLE DEVICE | C |
| ○ | × | ○ | ○ | VEHICLE-MOUNTED DEVICE | A |
| × | ○ | ○ | ○ | VEHICLE-MOUNTED DEVICE | A |
| ○ | ○ | × | × | PORTABLE DEVICE | |
| ○ | × | ○ | × | PORTABLE DEVICE | B |
| × | ○ | ○ | × | PORTABLE DEVICE | B |
| ○ | × | × | ○ | PORTABLE DEVICE | C |
| × | ○ | × | ○ | PORTABLE DEVICE | C |
| × | × | ○ | ○ | VEHICLE-MOUNTED DEVICE | A |
| ○ | × | × | × | PORTABLE DEVICE | |
| × | × | ○ | × | PORTABLE DEVICE | B |
| × | × | × | ○ | PORTABLE DEVICE | C |
| × | × | × | × | PORTABLE DEVICE | |

VEHICLE-MOUNTED DEVICE, NAVIGATION SYSTEM, AND CONTROL METHOD FOR NAVIGATION SYSTEM

TECHNICAL FIELD

The present invention relates to vehicle-mounted devices, navigation systems, and control methods for navigation systems, and more particularly, to a vehicle-mounted device, a navigation system and a control method for a navigation system in which point location information is sent to the vehicle-mounted device from a portable device.

BACKGROUND ART

A vehicle-mounted navigation system for navigation to a destination is widely used. The vehicle-mounted navigation recognizes the current position by a GPS (Global Positioning System) receiver, and guides the vehicle to the destination. Another type of navigation system is used in which a portable device such as a cellular phone is equipped with GPS and the user is guided to the destination.

There has been developed a navigation system having improved convenience by transferring information about the destination or the like that is set outside of the vehicle to the vehicle-mounted device from the portable device. Patent Document 1 discloses a system in which positional information is acquired by a portable information processing device and the positional information is set as the destination of the vehicle-mounted navigation device. Patent Document 2 discloses a system in which destinations that are set in multiple portable navigation devices are sent to a vehicle-mounted display device, and the final destination may be set from among these destinations. According to this system, it is possible to set a route to the final destination via multiple destinations.

Patent Document 3 discloses a method capable of appropriately setting the name of an added location by acquiring the name of the facility closest to the added location on a map displayed. Patent Document 4 discloses a navigation device in which it is determined whether information about the added location by the user is updated when map information is updated and the user is given a notification when the information about the added location is updated.

Prior Art Documents

Patent Document 1: Japanese Patent Application Publication No. 2003-177027;

Patent Document 2: Japanese Patent Application Publication No. 2007-263802;

Patent Document 3: Japanese Patent Application Publication No. 2000-337913; and

Patent Document 4: Japanese Patent Application Publication No. 2005-249466.

SUMMARY OF THE INVENTION

Problems to be Solved by the Invention

The general vehicle-mounted navigation device is equipped with a database that stores POI (Point Of Interest) information that is information about tourist spots and various facilities. The POI information includes, for example, the name of facility, address, telephone number and positional information (latitude and longitude). Generally, the portable devices such as cellular phones are capable of communicating with a server on a contents-provider side with radio and acquiring POI information. The server on the contents-provider side is equipped with its own map database like the vehicle-mounted navigation.

In some cases, the map database of the vehicle-mounted navigation device and the map database of POI information sent from the portable device may be different from each other. For example, there may be a case where part of the POI information owned by the portable device is not defined (for example, omission of block or house number of the address or the like) or another case where there is a difference between the old address and the new address due to the merger of municipalities or the like. In contrast, the map database of the vehicle-mounted navigation device may be configured to correct the position of the point location in order to guide the vehicle more easily (for example, the locations of facilities are set on roads). In a case where the POI information stored in the map database that is different from that stored in the vehicle-mounted navigation device is sent from the portable device, when it is attempted to display the point location on the map display screen on the basis of the positional information on the portable device side, the above position of the point location may deviate from that on the vehicle-mounted-device side and may not be displayed correctly.

The present invention has been made in view of the above problems and aims at improving the precision of guiding the route of a navigation device by correcting positional information as necessary in a case where point-of-interest information is sent from a portable device to a vehicle-mounted device.

Means for Solving the Problems

A vehicle-mounted device includes: reception means for receiving a telephone number and positional information about a first point location from a portable device; storage means for storing telephone numbers and positional information about multiple second point locations; first comparison means for comparing the telephone number of the first point location with the telephone numbers of the multiple second point locations; second comparison means for comparing the positional information about the first point location with the positional information about the multiple second point locations; display means for displaying a point of interest on a map on the basis of comparison results of the first and second comparison means by using either the positional information about the first point location or the positional information about one of the multiple second point locations corresponding to the first point location. According to the present invention, both the telephone number and positional information are used to compare the point of interest on the portable device side and the point of interest on the vehicle-mounted device side. Then, on the basis of comparison results, the first point location received from the portable device or one of the second point locations stored in the vehicle-mounted device is displayed on the map. A more appropriate one of the two pieces of the positional information is used to displaying the point of interest, so that the precision of display can be improved.

A navigation system includes: a portable device having sending means for sending a telephone number and positional information of a first point location to a vehicle-mounted device; and the vehicle-mounted device including: reception means for receiving the telephone number and positional information about the first point location from a portable device; storage means for storing telephone numbers and positional information about multiple second point locations; first comparison means for comparing the telephone number of the first point location with the telephone numbers of the multiple second point locations; second comparison means for comparing the positional information about the first point location with the positional information about the multiple second point locations; display means for displaying a point of interest on a map on the basis of comparison results of the first and second comparison means by using either the positional information about the first point location or the positional information about one of the multiple second point locations corresponding to the first point location.

A control method for a navigation system including a portable device and a vehicle-mounted device, includes: sending a telephone number and positional information of a first point location to a vehicle-mounted device; comparing the telephone number of the first point location with telephone numbers of multiple second point locations stored in the vehicle-mounted device; comparing the positional information about the first point location with the positional information about the multiple second point locations; and displaying a point of interest on a map on the basis of results of comparisons about the telephone number and the positional information by using either the positional information about the first point location or the positional information about one of the multiple second point locations corresponding to the first point location.

Effects of the Invention

According to the present invention, it is possible to improve the precision of guiding the route in the navigation device by using positional information suitable for map display among positional information sent from the portable device and positional information stored in the vehicle-mounted device.

BRIEF DESCRIPTION OF THE DRAWINGS

FIG. 8 is an illustration for describing a determination process in the vehicle-mounted device;

MODES FOR CARRYING OUT THE INVENTION

Embodiments are now described with reference to the drawings.

Embodiment 1

Figure 1:
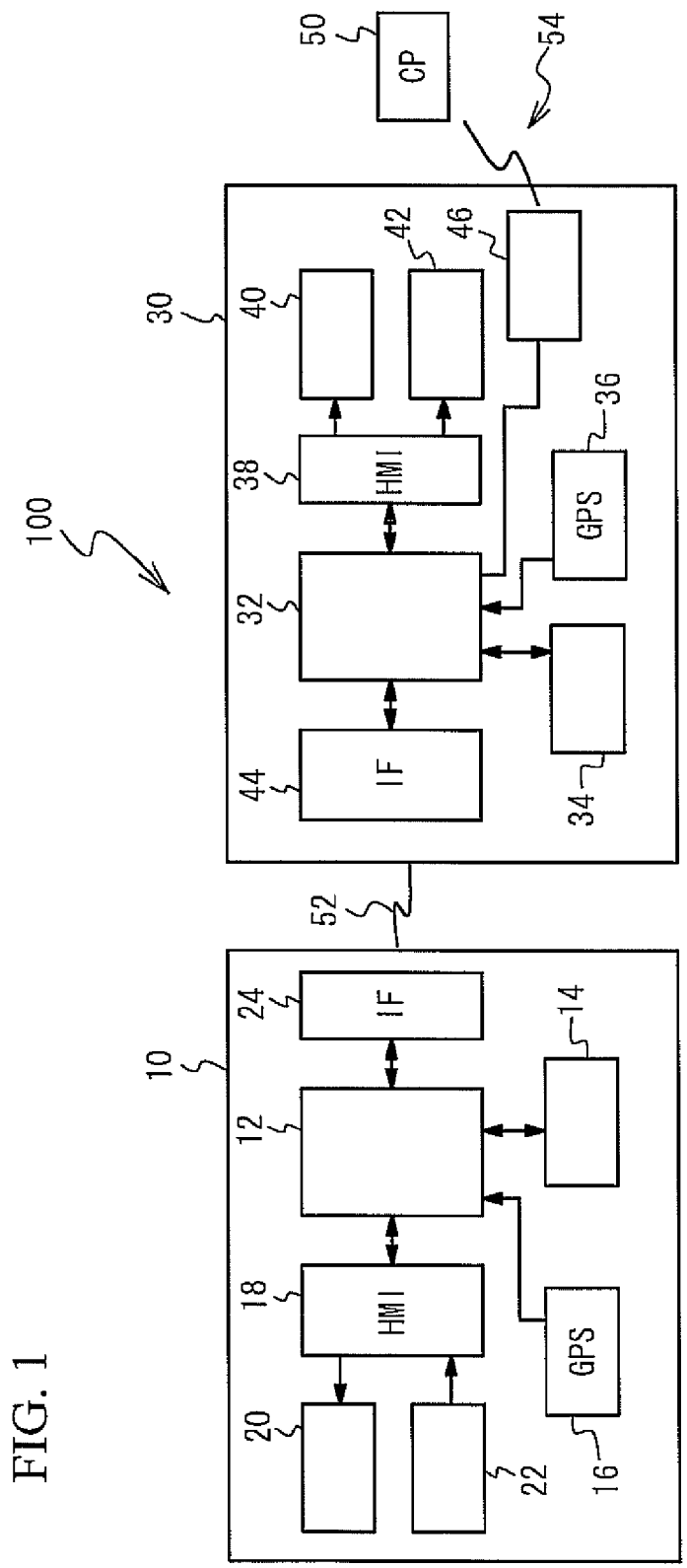
FIG. 1 is a block diagram of a navigation system in accordance with an embodiment 1.

FIG. 1 is a block diagram of a navigation system in accordance with an embodiment 1. Referring to FIG. 1, a navigation system 100 includes a vehicle-mounted device 10, which is a vehicle-mounted navigation device, and a.

portable device 30, which may be a cellular phone, for example. Information may be transferred between the vehicle-mounted device 10 and the portable device 30 by a radio communication 52 such as a Bluetooth communication or an optical communication using infrared rays. The portable device 30 is capable of communicating with a center server (CP) 50 via a mobile communication network 54.

The vehicle-mounted device 10 includes a control part 12, a storage part 14, a GPS reception part 16, an interface (IF) part 24, a human interface (HMI) part 18, a display part 20 and an operation part 22. The storage part 14 is, for example, a hard disk unit, and stores map information that is information about map data, and destination information that is information about destinations. The storage part 14 supplies the map information and the destination information to the control part 12. The storage part 14 stores destination information acquired from the control part 12. The GPS reception part 16 recognizes the position of the vehicle from a GPS signal, and outputs information about the position of the vehicle to the control part 12. The GPS reception part 16 is capable of recognizing the position of the vehicle by using self navigation information from a self navigation part (not shown) in addition to the GPS signal. The HMI part 18 is an interface between the display part 20 and the control part 12 and between the operation part 22 and the control part 12. The display part 20 is, for example, a liquid crystal display, and is used to display the map and a menu list from a signal from the control part 12. The operation part 22 is, for example, a touch panel or button, and is used to output an operation signal to the control part 12. For example, the user may select a menu by operating the operation part 22. The IF part 24 sends information supplied from the control part 12 to the portable device 30. The IF part 24 sends information received from the portable device 30 to the control part 12.

The portable device 30 includes a control part 32, a storage part 34, a GPS reception part 36, an HMI part 38, a display part 40, an operation part 42 and a telephone IF part 46. The telephone IF part 46 is involved in transmission and reception of information between the control part 32 and an external part via the mobile communication network 54. The control part 32 may obtain the latest map data or the like from the data center server 50 via the mobile communication network 54 and the telephone IF part 46. The functions of the other parts are similar to those of the vehicle-mounted device 10, and a description thereof is omitted.

Figure 2:
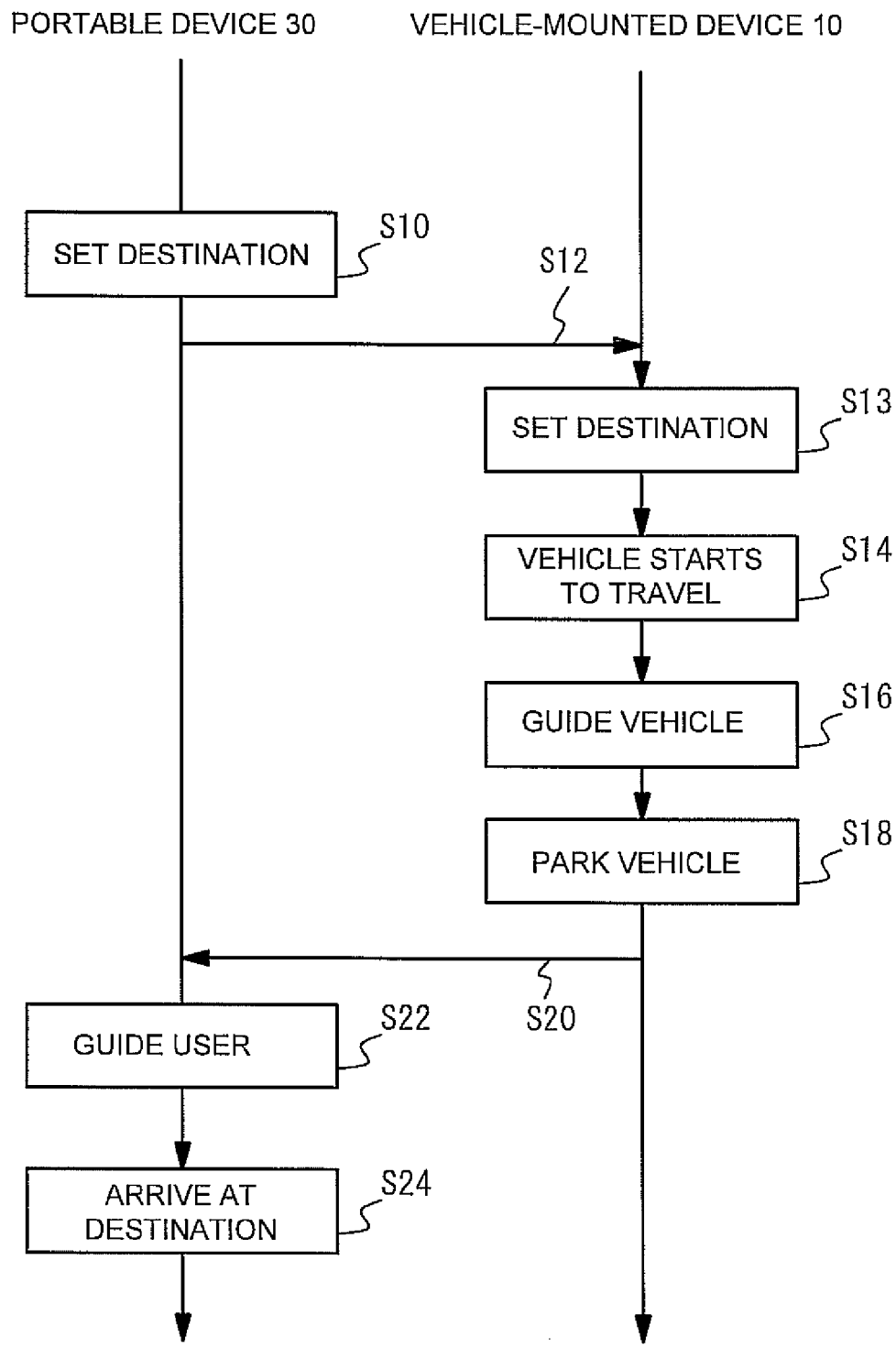
FIG. 2 is a flowchart of an operation of the navigation system in accordance with the embodiment 1.

FIG. 2 is a flowchart of an exemplary operation of the navigation system in accordance with the embodiment 1. Referring to FIG. 2, the control part 32 of the portable device 30 sets a destination based on an input from the operation part 42 or a list of destinations stored in the storage part 34 (step S10). The control part 32 sends destination information to the vehicle-mounted device 10 via the IF part 44 (step S12). The control part 12 of the vehicle-mounted device 10 obtains the destination information via the IF part 24 and sets the destination of the vehicle based on the obtained destination information (step S13). When the control part 12 recognizes that the vehicle starts to travel (step S14), the control part 12 acquires information about the position of the vehicle from the GPS reception part 16 and information about the map data from the storage part 14, controls the display part 20 to display a corresponding map, a route to the destination and the destination, and guides the vehicle to the destination (step S16). When the control part 12 recognizes that the vehicle is parked (step S18), the control part 12 sends information about the current position to the portable device 30 via the IF part 24. The control part 32 of the portable device 30 obtains the information about the current position via the IF part 44. The control part 32 guides the user to the destination like the control part of the vehicle-mounted device 10 (step S22). When the control part 32 recognizes that the vehicle arrives at the destination (step S24), the control part 32 ends the guidance.

As described above, in the navigation system in accordance with the embodiment 1, the destination information and information about the current position are transferred by communications between the portable device 30 and the vehicle-mounted device 10. It is thus possible for the vehicle-mounted device 10 to guide the vehicle to the destination that is set by the portable device 30. Further, it is possible for the portable device 30 to guide the user to the destination after the vehicle is parked.

Now, a detailed description is given of setting of the destination of the vehicle by the navigation system in accordance with the embodiment 1.

Figure 3:
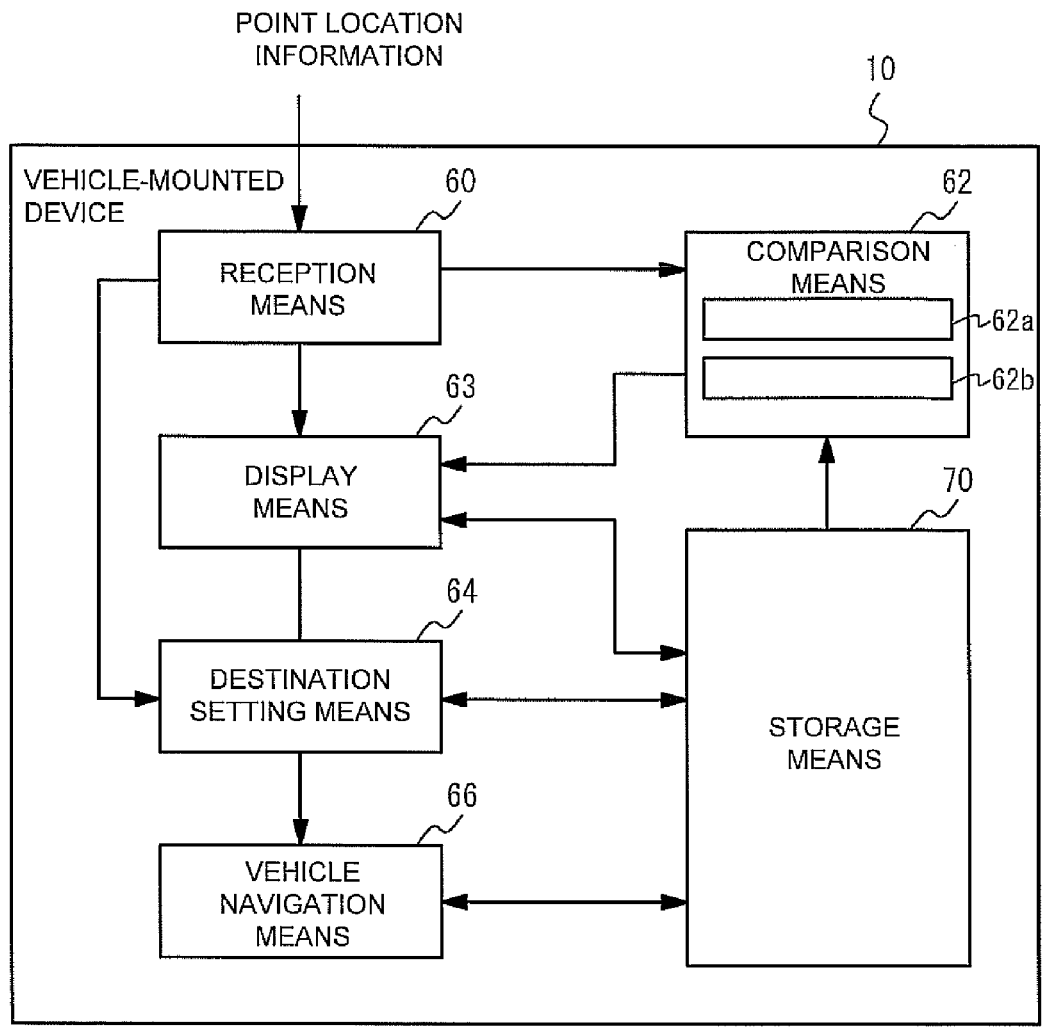
FIG. 3 is a functional block diagram of a vehicle-mounted device.

FIG. 3 is a functional block diagram of the vehicle-mounted device 10. the control part 12 of the vehicle-mounted device 10 functions as a reception means 60, a comparison means 62, a display means 63, a destination setting means 64 and a vehicle navigation means 66. The storage part 14 functions as a storage means 70. The storage means 70 stores map information and POI information that are information about the map data, a destination list having destinations that are selectable, a parking list having parking lots near the destinations, and so on. The destination list is composed of multiple point locations (second point locations) added in the map database of the vehicle-mounted device 10, and includes the telephone numbers and positional information as information about the point locations. The information about the point locations may include the addresses and the names of facilities.

The reception means 60 receives point location information about a point location (first point location) from the portable device 30 (since the destination sent by the portable device 30 may not be set as the destination of the vehicle, "point location" is simply used in the following description. The point location information includes at least the telephone number and positional information on the point location. Additionally, the point location information may include the address of the point location and the name of the facility. The comparison means 62 compares the POI information about the point location received by the reception means 60 with the POI information about the multiple point locations stored in the storage means 70, and outputs the results of comparison to the destination setting means 64. The comparison means 62 includes at least a telephone number comparing means 62a (a first comparison means) involved in comparison of telephone numbers, and a positional information comparing means 62b (a second comparison means) involved in comparison of positional information. Additionally, the comparison means 62 may include means for comparing another POT information (address, facility name and so on).

The display means 63 displays the point location received from the portable device 30 on the map on the display part 40 on the basis of the comparison results of the comparison means 62. There are a case where the point location is displayed by using the positional information about the point location received from the portable device 30, and another case where the point location is displayed by using positional information about one of the multiple point locations (POIs) stored in the storage means 70 that corresponds to the point location received. A detailed description will be given later. The destination setting means 64 sets the destination of the vehicle by a user's operation by referring to the point location displayed on the map. The destination of the vehicle may be the destination displayed by the display means without any change, or another destination may be set. The vehicle navigation means 66 navigates the vehicle to the destination set by the destination setting means on the basis of the information about the position of the vehicle output by the GPS reception part 16 and the map information in the storage means 70.

Figure 4:
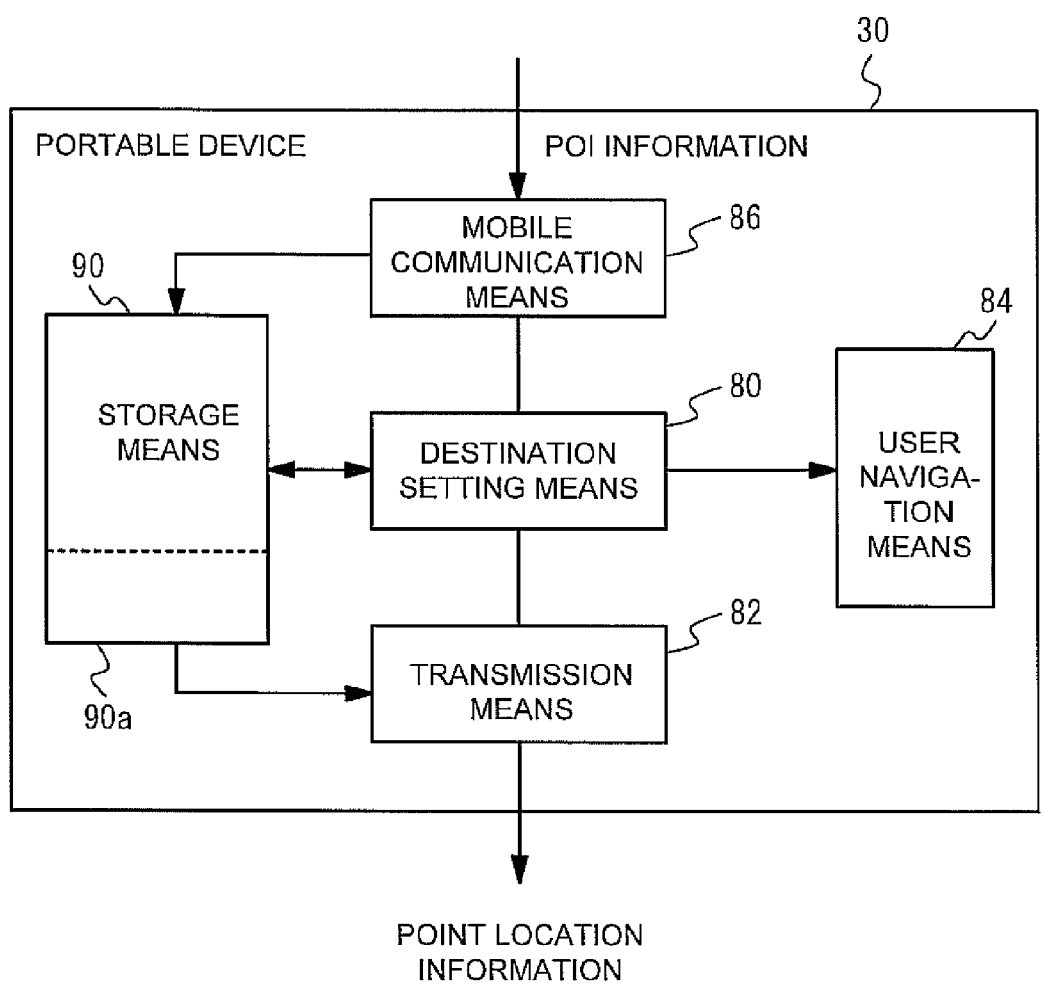
FIG. 4 is a functional block diagram of a portable device.

FIG. 4 is a functional block diagram of the portable device 30. The control part 32 of the portable device functions as a destination setting means 80, a transmission means 82, a user navigation means 84, and a mobile communication means 86. The storage part 34 functions as a storage means 90. The storage means 90 stores map information that is information about map data, a destination list having destinations that may be selected, and so on. The mobile communication means 86 acquires POI information from the center server 50 via the telephone IF part 46 and the mobile communication network 54.

The destination setting means 80 sets the destination on the basis of the destination list stored in the storage means 90 or the POI information acquired by the mobile communication means 86. The destination setting means 80 stores the set information about the destination in a storage area 90a for setting in the vehicle-mounted device, which is a part of the storage means 90. The transmission means 82 reads the destination information stored in the storage area 90a for setting in the vehicle-mounted device, and transmits it to the vehicle-mounted device 10. The user navigation means 84 navigates the user to the destination set by the destination setting means 80 when the guidance by the vehicle-mounted device is not carried out.

FIGS. 5(a), 5(b), 6(a) and 6(b) are flowcharts of operations of the portable device 30 in setting the destination by the portable device 30 (step S10 in FIG. 2), and are views of screens on the display part 40.

Figure 5A:
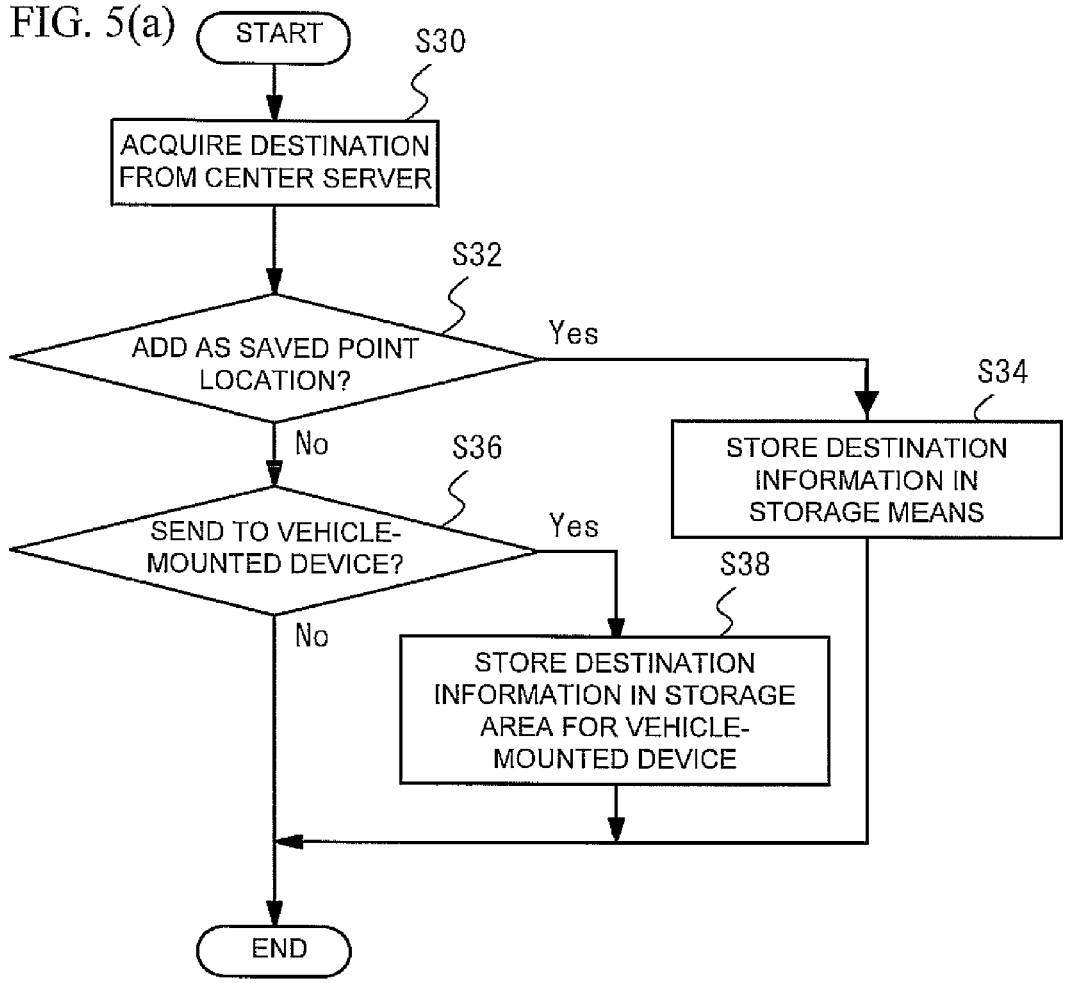
FIG. 5 is a flowchart (part 1) of a process in the portable device.

FIG. 5(a) is a flowchart that illustrates an operation of acquiring the destination by the portable device 30. The mobile communication means 86 acquires the destination from the center server 50 via the mobile communication network 54 and the telephone IF part 46 (step S30). The destination setting means 80 determines whether the destination acquired should be added as the saved point location (step S32). When the answer of step S32 is Yes, the destination setting means 80 stores the POI information about the acquired destination in the storage means 90 (step S34). Thus, information about the destination may be obtained without accessing the center server 50 from the next time. Next, the destination setting means 80 determines whether the acquired destination should be sent to the vehicle-mounted device (step S36). When the answer of step S36 is Yes, the destination setting means 80 stores the information about the acquired destination in the storage area 90a for setting in the vehicle-mounted device (step S38).

Figure 5B:
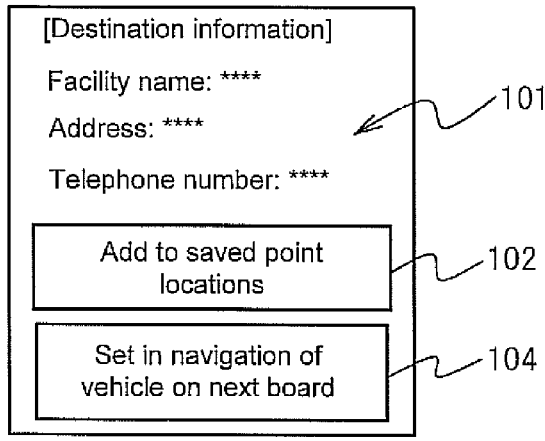

FIG. 5(b) is a view of a display screen related to the flowchart of FIG. 5(a). Information 101 about the destination acquired at step S30 is displayed in an upper portion of the screen. The user operates the operation part 42 of the portable device 30 (for example, a cross-key or a touch panel) to select an arbitrary button from among given operation buttons (102, 104). When the user selects "Add to saved point locations (102)", the determination answer of step S32 is Yes. When the user selects "Set in navigation of vehicle on next board (104)", the determination answer of step S36 is Yes.

Figure 6A:
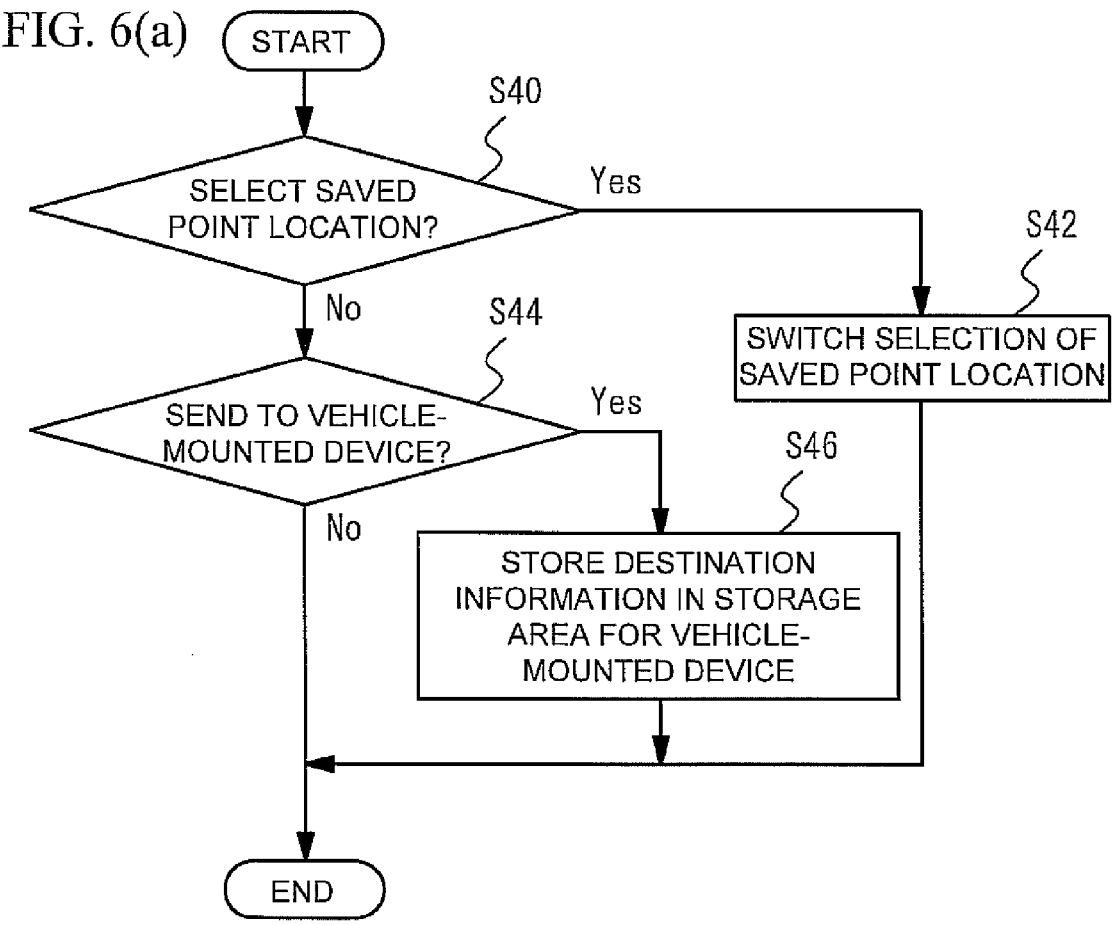
FIG. 6 is a flowchart (part 2) of the process in the portable device.
Figure 6B:
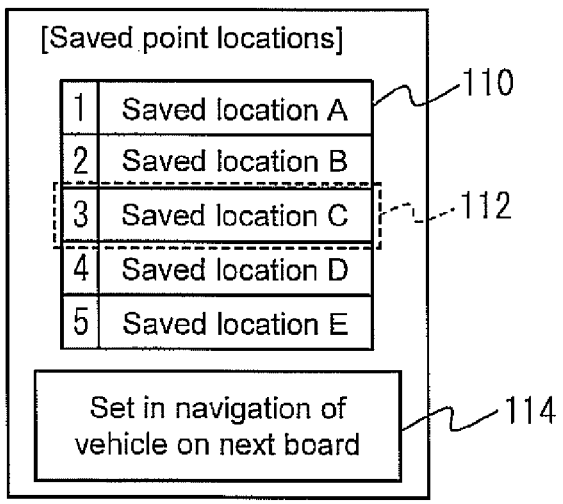

FIG. 6(a) is a flowchart of an operation involved in selection of saved point locations, and FIG. 6(b) illustrates a screen for selection of a saved point location corresponding to FIG. 6(a). Referring to FIGS. 6(a) and 6(b), multiple destinations 110 added in the storage means 90 as saved point locations are displayed on the upper side of the screen. The user moves a saved point location selection icon 112 up and down to select saved point locations one by one. In response to the above operation, the destination setting means 80 switches selection of saved point location to select one saved point location from among the multiple saved point locations (steps S40, S42). When the user selects "Set in navigation of vehicle on next board", the destination setting means 80 stores information about the selected saved point location in the storage area 90a of the storage means 90 for setting in the vehicle-mounted device (steps S44, S46).

As described above, the portable device 30 sets the destination (point location information) to be sent to the vehicle-mounted device 10 from among the destinations in the center server 50 or the saved point locations stored in the storage means 90. The destination thus set is automatically sent to the vehicle-mounted device 10 when the vehicle-mounted device is activated on the next board.

Figure 7:
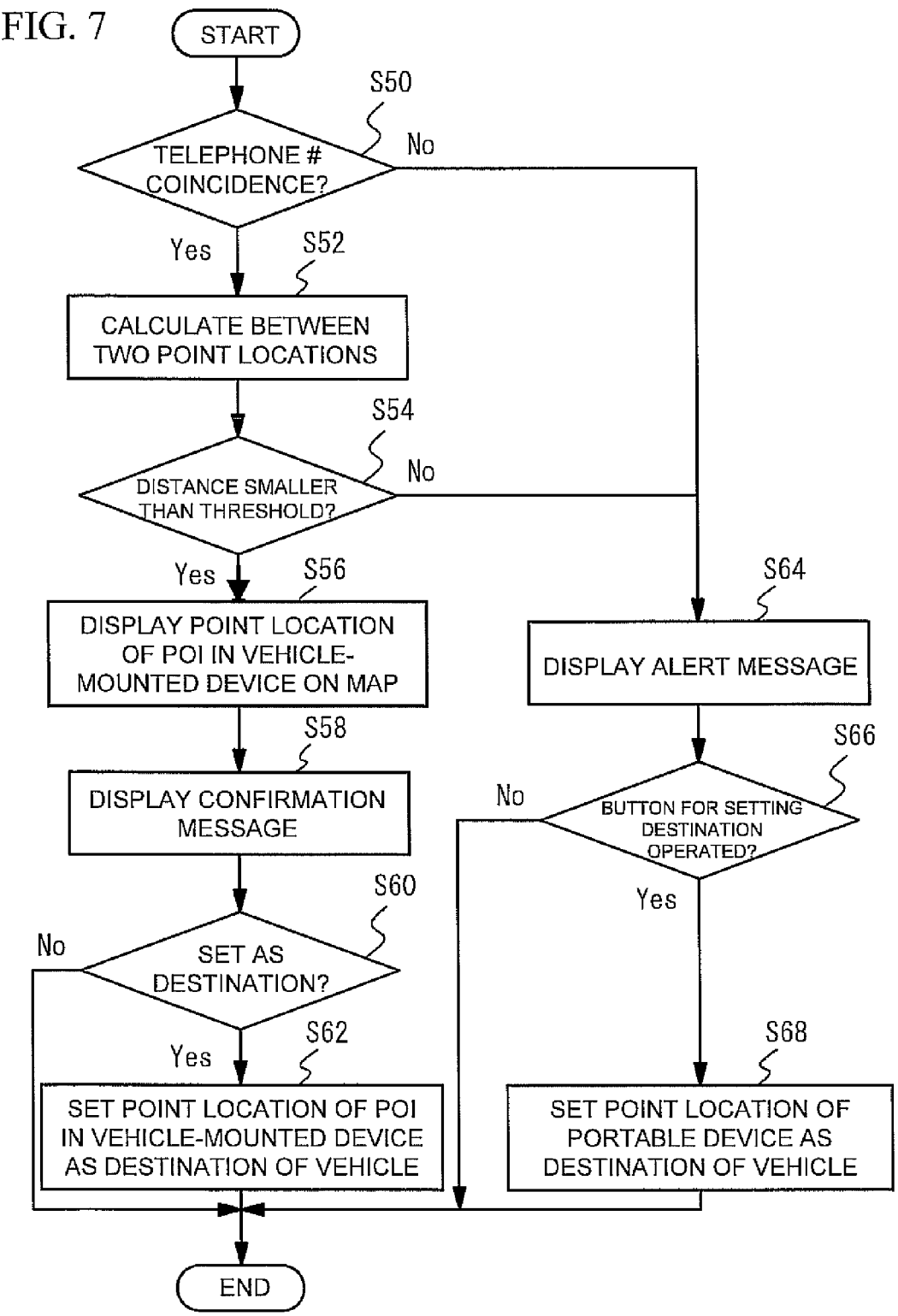
FIG. 7 is a flowchart of a process in the vehicle-mounted device.

FIG. 7 is a flowchart of an operation of setting the destination (step S13 in FIG. 2) by the vehicle-mounted device 10. First, the telephone number comparing means 62a compares the telephone number of the point location received from the portable device 30 with the telephone numbers of the multiple POIs stored in the storage means 70 of the vehicle-mounted device 10 (step S50). When both the telephone numbers coincide with each other, the positional information comparing means 62b compares the positional information about the point location received from the portable device with the positional information about one of the POIs stored in the storage means 70 having the same telephone number as that from the portable device, and calculates the distance between the two points (step S52). Then, the positional information comparing means 62b determines whether the distance calculated at step S52 is smaller than a predetermined threshold value (step S54).

At step S54, when the distance between the point location from the portable device 30 and the POI in the vehicle-mounted device is smaller than the predetermined threshold value, the display means 63 of the vehicle-mounted device 10 displays the point location on the map by using the positional information of the POI having the same telephone number as that of the point location from the portable device 30 (step S56). That is, the display means 63 corrects the position of the point location sent from the portable device 30 to the position of the corresponding POI stored in the vehicle-mounted device 10 and displays the point location on the map.

Next, the display means 63 displays a confirmation message (see FIG. 9) directed to the user, which message confirms whether the point location received from the portable device 30 should be set as the destination of the vehicle (step S58). The destination setting means 64 determines whether the point location should be set as the destination of the vehicle by referring to, for example, the user's input (step S60). When the answer is Yes, the destination setting means 64 sets the point location as the destination of the vehicle (step S62).

When both the telephone numbers do not coincide with each other at step S50 or when the distance between the two points is equal to or larger than the threshold value, the display means 63 displays an alert message (see FIG. 10) to the user, which message shows that the display may be incorrect because the display is done by using the positional information about the point location received from the portable device 30 (step S64). Then, the destination setting means 64 determines whether the point location sent by the portable device 30 should be set as the destination of the vehicle on the basis of the user's input (for example, whether the destination setting button (see FIG. 9) of the operation part 22 is depressed or not) (step S66). When the answer is Yes, the destination setting means 64 sets the point location received from the portable device 30 as the destination of the vehicle (step S68). That is, the position of the point location sent by the portable device 30 is displayed as it is without correcting the position of the POI stored in the vehicle-mounted device 10.

FIG. 8 is a table that describes the determining operations at steps S50 and S54 in FIG. 7 and indicate exemplary results of comparison between the POI information supplied from the portable device 30 and the POI information stored in the vehicle-mounted device 10. Among the results of comparison in POI information, comparison results regarding the name, address and telephone number are indicated as "O" for equal cases and "X" for unequal cases. As to the distance between the two points, the comparison results are indicated as "O" for cases where the distance is smaller than the threshold value (for example, 100 m) and "X" for cases where the distance is equal to or larger than the threshold value. A column of "Positional information" has information that shows whether the positional information supplied from the portable device 30 or that stored in the vehicle-mounted device 10 should be used to display the point location on the map.

Referring to FIG. 8, in cases (A) where "O" is described in the columns of "Telephone number" and "Distance", it is considered that the vehicle-mounted device 10 has a POI that corresponds to the destination which the portable device 30 has, but there is a positional deviation due to a certain factor (for example, a difference in the format of map database). In this case, it is considered that the POI information stored in the vehicle-mounted device 10 has no error. Thus, the positional information sent by the portable device 30 is corrected to the positional information stored in the vehicle-mounted device 10, and the position of the point location is displayed on the map by using the positional information stored in the vehicle-mounted device 10.

In cases (B) where "O" is described in the column of "Telephone number" and "X" is described in the column of "Distance", there is a possibility that the facility of the destination may have been moved. In this case, it is considered that the POI information acquired by the portable device 30 from the center server 50 is later and more correct than the POI information stored in the vehicle-mounted device 10. Thus, the point location is displayed on the map by using the positional information supplied from the portable device 30. In cases where "X" is described in the column of "Telephone number" and "O" is described in the column of "Distance", there is a possibility that POI stored in the vehicle-mounted device 10 may be a different point location (facility) adjacent to (or near) the destination set by the portable device 30. Even in these cases, it is considered that the user wants to go to the point location set by the portable device 30. Thus, the point location is displayed on the map by using the positional information supplied from the portable device 30.

In cases other than the above, it is preferable that the map is generally displayed by using the POI information supplied from the portable device 30 in case where the POI information supplied from the portable device 30 do not coincide with the POI information stored in the vehicle-mounted device 10. This is because the POI information stored in the vehicle-mounted device 10 may not have much information in terms of storage capacity or may be old in the absence of updating. In contrast, the POI information in the portable device 30 is acquired from the center server 50 and is regularly updated. Thus, there is a high possibility that the POI information in the portable device 30 has high precision.

Figure 9:
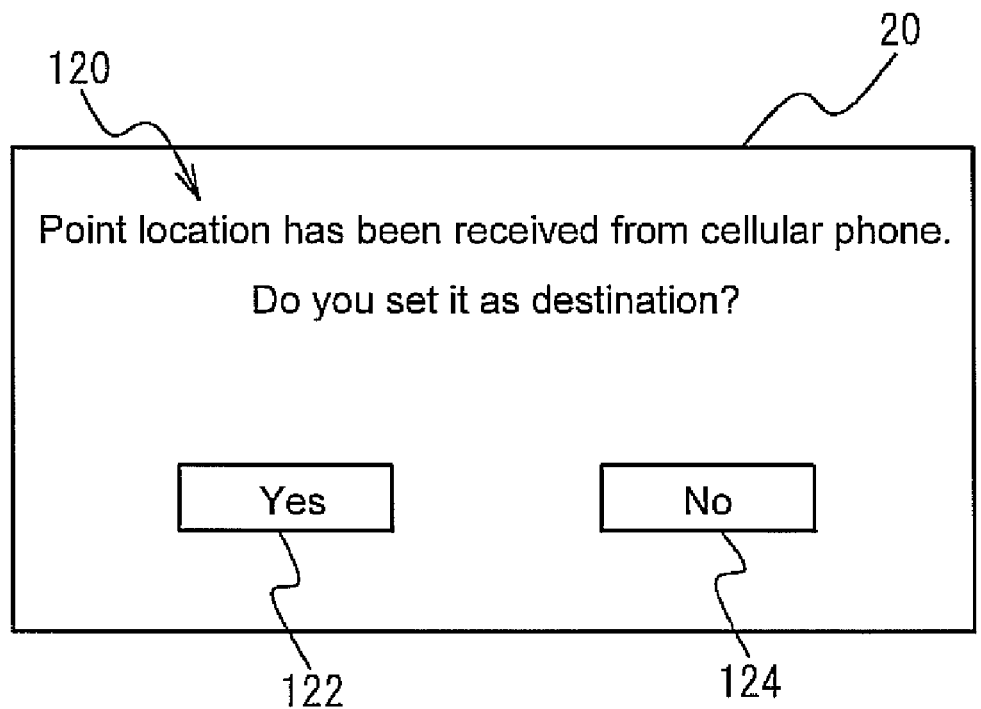
FIG. 9 illustrates a display screen (part 1) corresponding to a process in the vehicle-mounted device.
Figure 10:
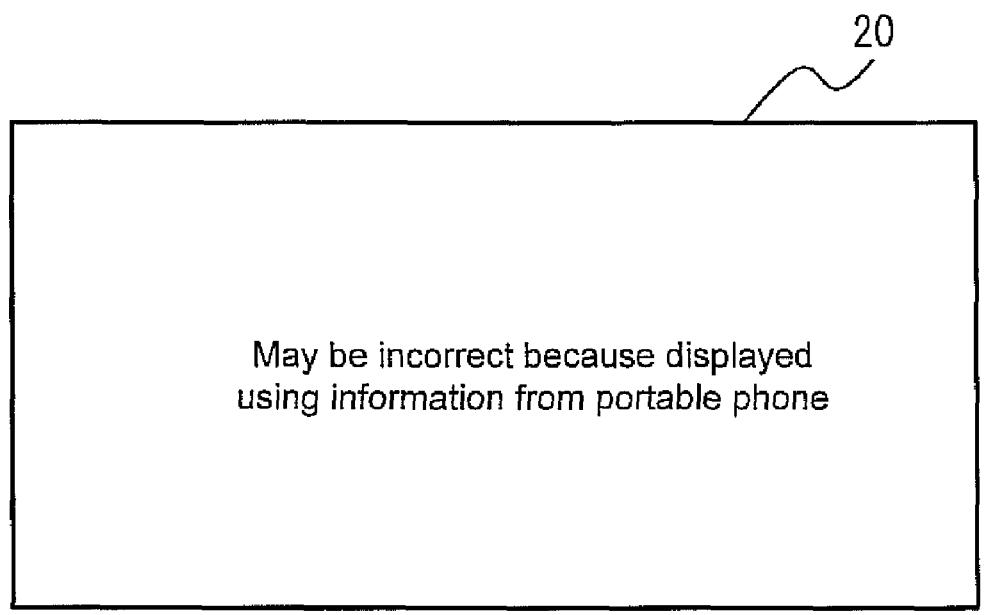
FIG. 10 illustrates a display screen (part 2) corresponding to the process in the vehicle-mounted device.

FIG. 9 is a view of a display screen related to the operation of the destination setting in the vehicle-mounted device 10 (steps S58 and S60 in FIG. 7). Referring to FIG. 9, a confirmation message 120 for confirming that the information about the point location has been received from the portable device 30 is displayed on the display part 20, and the user determines whether the destination should be set based on the received point location. When the user selects "Yes (122)", the answer of step S60 in FIG. 7 is Yes. When the user selects "No (124)", the answer of step S60 is No. FIG. 10 is a view of a display screen having the alert message displayed at step S64 In FIG. 7.

According to the embodiment 1, the point location sent by the portable device 30 and the POI stored in the vehicle-mounted device 10 are compared with each other, and an appropriate one of the two point locations is displayed on the map. It is thus possible to improve the precision of displaying the point location in navigation. Further, the positional information is corrected as necessary, and then, the map is displayed. Thus, there is no need to modify the map database so as to be consistent with that of the vehicle-mounted device 10, and the convenience to the user can be improved. Furthermore, the point information having an improved precision of display may be set as the destination, and the precision of route guidance in navigation may be improved.

The telephone number and the distance between the two point locations are used to compare the map database of the vehicle-mounted device 10 and that of the portable device 30 (that is, to determine whether the POI corresponding to the point location sent by the portable device 30 is stored in the vehicle-mounted device 10). It is thus possible to realize more precise comparison and avoid an erroneous correction in which the positional information about the point location that originally needs no correction is corrected to the positional information stored in the vehicle-mounted device 10.

As illustrated at step S64 in FIG. 7, in the case where the map is displayed by using the positional information about the point location supplied from the portable device 30, the alert message is issued against the user. It is thus possible for the user to operate the vehicle-mounted device 10 as necessary and correct the destination to the appropriate location. For example, it is possible to restrain the destination from being set in an inappropriate location as the destination (a definitely inappropriate location in light of the user's geographic sense such as a location in a river) and to improve the precision of navigation.

In FIG. 7, prior to the step (S50) at which the two telephone numbers are compared, it is possible to compare the map database of the vehicle-mounted device 10 (first map database) with the map database of the portable device 30 (second map database). That is, the reception means 60 of the vehicle-mounted device 10 receives identification information about the first map database from the portable device 30. The storage means 70 of the vehicle-mounted device 10 stores identification information about the second map database including multiple POIs. The destination setting means 64 of the vehicle-mounted device 10 compares the identification information about the first map database and the identification information about the second map database with each other. When the pieces of the identification information coincide with each other, it can be said that the portable device 30 and the vehicle-mounted device 10 have the same database. Thus, there is no need to correct the positional information. Thus, the map is displayed by using the positional information about the point location received from the portable device 30. The identification information may be the product name or version information about the map database.

Some preferred embodiments of the present invention have been described. The present invention is not limited to the specifically described embodiments but may be varied or changed within the range of the invention defined in claims.

The invention claimed is:

1. A vehicle-mounted device comprising:
    a reception part configured to receive a telephone number and positional information about a first point location that is set as a destination from a portable device;
    a storage part configured to store telephone numbers and positional information about multiple second point locations;
    a first comparison part configured to compare the telephone number of the first point location with the telephone numbers of the multiple second point locations;
    a second comparison part configured to compare the positional information about the first point location with the positional information about the multiple second point locations;
    a display part configured to display a point location on a map on the basis of comparison results of the first comparison part and the second comparison part by using either the positional information about the first point location or the positional information about one of the multiple second point locations corresponding to the first point location;
    wherein:
    the first comparison part determines whether the telephone number of the first point location coincides with any of the telephone numbers of the multiple second point locations, and the second comparison part calculates distances between the first point location and the multiple second point locations; and
    the display part displays the point location on the map by using the positional information about one of the multiple second point locations, the telephone number of which coincided with the telephone number of the first point location, in the positional information stored in the storage part in a case where the telephone number of the first point location coincides with the telephone number of one of the multiple second point locations and the distance between the first point location and the one of the multiple second point locations is smaller than a predetermined value, and displays the point location on the map by using the positional information about the first point location received from the portable device in another case.

2. The vehicle-mounted device according to claim 1, wherein the display part displays an alert message to a user in a case where the point location is displayed on the map by using the positional information received from the portable device.

3. The vehicle-mounted device according to claim 1, wherein:
    the reception part receives, from the portable device, identification information a first map database in which the first point location is included;
    the storage part stores identification information about second map database in which the multiple second point locations; and
    the display part displays the point location on the map by always using the positional information received from the portable device in a case where the identification information about the first map database coincides with the identification information about the second map database.

4. A navigation system comprising:
    a portable device having a sending part configured to receive a telephone number and positional information of a first point location that is set as a destination to a vehicle-mounted device; and the vehicle-mounted device including: a reception part configured to receive the telephone number and positional information about the first point location from a portable device; a storage part configured to store telephone numbers and positional information about multiple second point locations; a first comparison part configured to compare the telephone number of the first point location with the telephone numbers of the multiple second point locations; a second comparison part configured to compare the positional information about the first point location with the positional information about the multiple second point locations; a display part configured to display a point of interest on a map on the basis of comparison results of the first comparison part and the second comparison part configured to use either the positional information about the first point location or the positional information about one of the multiple second point locations corresponding to the first point location;

wherein:

the first comparison part determines whether the telephone number of the first point location coincides with any of the telephone numbers of the multiple second point locations, and the second comparison part calculates distances between the first point location and the multiple second point locations; and the display part displays the point location on the map by using the positional information about one of the multiple second point locations, the telephone number of which coincided with the telephone number of the first point location, in the positional information stored in the storage part in a case where the telephone number of the first point location coincides with the telephone number of one of the multiple second point locations and the distance between the first point location and the one of the multiple second point locations is smaller than a predetermined value, and displays the point location on the map by using the positional information about the first point location received from the portable device in another case.

5. The navigation system according to claim 4, wherein the portable device includes a mobile communication part configured to acquire information about the first point location.

6. A control method for a navigation system including a portable device and a vehicle-mounted device, comprising:

sending a telephone number and positional information of a first point location that is set as a destination to a vehicle-mounted device;

comparing the telephone number of the first point location with telephone numbers of multiple second point locations stored in the vehicle-mounted device;

comparing the positional information about the first point location with the positional information about the multiple second point locations; and displaying a point location on a map on the basis of results of comparisons about the telephone number and the positional information by using either the positional information about the first point location or the positional information about one of the multiple second point locations corresponding to the first point location;

wherein:

said comparing the telephone numbers comprises determining whether the telephone number of the first point location coincides with any of the telephone numbers of the multiple second point locations;

said comparing the positional information comprises calculating distances between the first point location and the multiple second point locations; and said displaying the point location on the map comprises:

displaying the point location on the map by using the positional information about one of the multiple second point locations, the telephone number of which coincided with the telephone number of the first point location, in the positional information stored in the vehicle-mounted device in a case where the telephone number of the first point location coincides with the telephone number of one of the multiple second point locations and the distance between the first point location and the one of the multiple second point locations is smaller than a predetermined value; and displaying the point location on the map by using the positional information about the first point location received from the portable device in another case.

* * * * *

UNITED STATES PATENT AND TRADEMARK OFFICE
CERTIFICATE OF CORRECTION

| | |
|---|---|
| PATENT NO. | : 8,380,431 B2 |
| APPLICATION NO. | : 13/056768 |
| DATED | : February 19, 2013 |
| INVENTOR(S) | : Takako Fukuda et al. |

It is certified that error appears in the above-identified patent and that said Letters Patent is hereby corrected as shown below:

In the Specification

At column 5, line number 49, Delete "POT", insert --POI--.

Signed and Sealed this
Second Day of December, 2014

Michelle K. Lee
*Deputy Director of the United States Patent and Trademark Office*